US007609329B2

(12) United States Patent
Baek et al.

(10) Patent No.: US 7,609,329 B2
(45) Date of Patent: Oct. 27, 2009

(54) DRIVING APPARATUS FOR LIQUID CRYSTAL DISPLAY

(75) Inventors: Jong Sang Baek, Kumi-shi (KR); Sun Young Kwon, Kumi-shi (KR)

(73) Assignee: LG Display Co., Ltd., Seoul (KR)

( * ) Notice: Subject to any disclaimer, the term of this patent is extended or adjusted under 35 U.S.C. 154(b) by 974 days.

(21) Appl. No.: 10/868,766

(22) Filed: Jun. 17, 2004

(65) Prior Publication Data

US 2004/0257321 A1 Dec. 23, 2004

(30) Foreign Application Priority Data

Jun. 21, 2003 (KR) ..................... 10-2003-0040487

(51) Int. Cl.
*H04N 3/14* (2006.01)

(52) U.S. Cl. ........................ 348/790; 348/792; 348/766

(58) Field of Classification Search ......... 348/790–792, 348/558, 751, 766, 511, 521, 525; 345/187, 345/132, 150, 153–154, 212, 214, 99, 94, 345/96; *H04N 3/14*
See application file for complete search history.

(56) References Cited

U.S. PATENT DOCUMENTS

| | | | | |
|---|---|---|---|---|
| 6,046,737 | A * | 4/2000 | Nakamura | 345/213 |
| 6,191,769 | B1 * | 2/2001 | Fujiwara et al. | 345/99 |
| 6,304,253 | B1 | 10/2001 | Sung et al. | |
| 6,348,931 | B1 * | 2/2002 | Suga et al. | 345/699 |
| 6,396,486 | B1 * | 5/2002 | Kuo et al. | 715/700 |
| 6,664,970 | B1 * | 12/2003 | Matsushita | 345/581 |
| 6,873,306 | B2 * | 3/2005 | Hansen et al. | 345/1.2 |

FOREIGN PATENT DOCUMENTS

| | | |
|---|---|---|
| JP | 06-075552 | 3/1994 |
| JP | 07-095498 | 4/1995 |
| JP | 10-011027 | 1/1998 |
| JP | 2000-089716 | 3/2000 |
| KR | 2000-53422 | 8/2000 |
| KR | 2002-01471 | 1/2002 |

OTHER PUBLICATIONS

Korea Office Action dated Jun. 1, 2005.

* cited by examiner

*Primary Examiner*—Trang U Tran
(74) *Attorney, Agent, or Firm*—McKenna Long & Aldridge LLP

(57) ABSTRACT

A driving apparatus for a liquid crystal display capable of adjusting a field area displayed on a liquid crystal display panel at the exterior thereof is disclosed. In the apparatus, an image signal processor separates a television image signal from a complex image signal and separates a complex synchronizing signal. A liquid crystal display panel displays the television image signal. A timing controller generates a source start pulse determining a display start time of the television image signal displayed on the liquid crystal display panel using an internal clock signal and the complex synchronizing signal from the image signal processor. A delay circuit delays the internal clock signal to apply it to the timing controller.

19 Claims, 10 Drawing Sheets

DRIVING APPARATUS FOR LIQUID CRYSTAL DISPLAY

This application claims the benefit of Korean Patent Application No. 2003-40487, filed on Jun. 21, 2003, which is hereby incorporated by reference for all purposes as if fully set forth herein.

BACKGROUND OF THE INVENTION

1. Field of the Invention

The present invention relates to a liquid crystal display, and more particularly to a driving apparatus for a liquid crystal display that is capable of adjusting a field area displayed on the liquid crystal display panel at the exterior thereof.

2. Discussion of the Related Art

Generally, a liquid crystal display (LCD) of active matrix driving system uses thin film transistors (TFT's) as switching devices to display moving pictures. Since such a LCD can be made into a device smaller in size than the existent Brown tubes, it has been widely used for a monitor for personal computers or notebook computers as well as office automation equipments such as copy machines, etc. and portable equipments such as cellular phones and pagers, etc.

The active matrix LCD displays a picture corresponding to video signals, such as television signals, on a picture element matrix or pixel matrix having liquid crystal cells arranged at crossings between gate lines and data lines. The thin film transistor is provided at each crossing between the gate lines and the data lines to thereby switch a data signal to be transmitted into the liquid crystal cell in response to a scanning signal (or gate pulse) from the gate line.

Such an LCD is classified into one using NTSC signal system and one using PAL signal system in accordance with television signal system.

Generally, if an NTSC signal (i.e., 525 vertical lines) is inputted, then the horizontal resolution of the LCD is expressed in accordance with the number of sampled data, and the vertical resolution thereof is expressed by a 234 line de-interlace scheme. On the other hand, if a PAL signal (i.e., 625 vertical lines) is inputted, then the horizontal resolution of the LCD is expressed in accordance with the number of sampled data, and the vertical resolution thereof is expressed by a processing system similar to the NTSC signal scheme in which one line is removed from every six vertical lines to be resulted in 521 lines.

Referring to FIG. 1 and FIG. 2, a related art LCD driving apparatus includes a liquid crystal display panel 30 having liquid crystal cells arranged in a matrix type, a gate driver 34 for driving gate lines GL of the liquid crystal display panel 30, a data driver 32 for driving data lines DL of the liquid crystal display panel 30, and an image signal processor 10 for receiving an NTSC television signal to apply a television complex signal divided into RGB data signals R, G and B to the data driver and output a complex synchronizing signal Csync. The LCD driving apparatus further includes a phase locked loop (PLL) control circuit 22 for outputting a phase locked loop and a timing controller 20 for receiving the complex synchronizing signal Csync from the image signal processor 10 to make a divisional output of a horizontal synchronizing signal Hsync and a vertical synchronizing signal Vsync and for applying control signals to the data driver 32 and the gate driver 34 in response to the horizontal synchronizing signal Hsync and the vertical synchronizing signal Vsync and the PLL control circuit 22 to thereby control a driving timing thereof.

The liquid crystal display panel 30 includes liquid crystal cells arranged in a matrix type and thin film transistors TFT provided at crossings between the gate lines GL and the data lines DL to be connected to the liquid crystal cells.

The thin film transistor TFT is turned on when a scanning signal, that is, a gate high voltage VGH from the gate line GL, is applied, to thereby apply a pixel signal from the data line DL to the liquid crystal cell. On the other hand, the thin film transistor TFT is turned off when a gate low voltage VGL is applied from the gate line GL, to thereby maintain a pixel signal charged in the liquid crystal cell.

The liquid crystal cell can be equivalently expressed as a liquid crystal capacitor LC, and includes a pixel electrode connected to the thin film transistor TFT and a common electrode that are opposed to each other having a liquid crystal therebetween. Further, the liquid crystal cell includes a storage capacitor Cst for making stable maintenance of the charged pixel signal until the next pixel is charged. This storage capacitor Cst is provided between a previous gate line and the pixel electrode. In such a liquid crystal cell, an alignment state of the liquid crystal having a dielectric anisotropy varies in response to the pixel signal charged via the thin film transistor TFT to control a light transmittance, thereby implementing a gray scale level.

The gate driver 34 sequentially applies the gate high voltage VGH to the gate lines GL in response to gate control signals GSP, GSC and GOE from the timing controller 20. Thus, the gate driver 34 drives the thin film transistors TFT connected to the gate lines GL for each gate line.

More specifically, the gate driver 34 shifts a gate start pulse GSP in response to a gate shift pulse GSC to generate a shift pulse. Further, the gate driver 34 applies the gate high voltage VGH to the corresponding gate line GL every horizontal period H1, H2, . . . in response to the shift pulse. In this case, the gate driver 34 applies the gate high voltage VGH only in an enable period in response to a gate output enable signal GOE. On the other hand, the gate driver 34 applies the gate low voltage VGL in the remaining period when the gate high voltage VGH is not applied to the gate lines GL.

The data driver 32 applies pixel data signals for each one line to the data lines DL every horizontal period 1H, 2H, . . . in response to data control signals SSP, SSC and SOE from the timing controller 20. Particularly, the data driver 32 applies RGB data from the image signal processor 10 to the liquid crystal display panel 30.

More specifically, the data driver 32 shifts a source start pulse SSP in response to a source shift clock SSC to generate a sampling signal. Then, the data driver 32 sequentially inputs analog RGB data for each certain unit in response to the sampling signal to latch them. Further, the data driver 32 applies the latched analog data for one line to the data lines DL.

The image signal processor 10 converts image signals applied from the exterior into voltages R, G and B suitable for driving of the liquid crystal display panel 30 in accordance with a property of the liquid crystal display panel 30 to apply them to the data driver 32, and applies a complex synchronizing signal Csync to the timing controller 20. Herein, the complex synchronizing signal Csync is separately generated from the image signal NTSC.

The PLL control circuit 22 generates a phase locked loop PLL having a desired oscillation frequency to apply it to the timing controller 20.

The timing controller 20 includes a frequency divider (not shown) for outputting a frequency-dividing signal DIV having the same period as the complex synchronizing signal Csync and various clocks, and synchronizes the complex synchronizing signal Csync with the frequency-dividing signal DIV with the aid of the phase locked loop PLL. Herein, the frequency-dividing signal DIV is synchronized with a center portion of the width of the complex synchronizing signal Csync. The timing controller 20 generates a horizontal synchronizing signal Hsync inverted from the complex synchronizing signal Csync using various clocks from the frequency divider. Further, as shown in FIG. 3, the timing controller 20 includes a source start pulse generator 24 for generating a source start pulse SSP that determines a horizontal display start time ST of the image signal NTSC displayed on the liquid crystal display panel 30.

The source start pulse generator 24 receives the complex synchronizing signal Csync from the image signal processor 10, and receives the frequency-dividing signal DIV and the horizontal synchronizing signal Hsync generated from the internal part of the timing controller 20. Thus, the source start pulse generator 24 generates the source start pulse SSP using the complex synchronizing signal Csync and the frequency-dividing signal DIV, or generates the source start pulse SSP using the complex synchronizing signal Csync and the horizontal synchronizing signal Hsync. The source start pulse SSP from the source start pulse generator 24 is applied to the data driver 32.

Such a related art LCD driving apparatus displays an image from a start time ST of the source start pulse SSP, of an image region of the image signal NTSC, on one horizontal line of the liquid crystal display panel 30 with the aid of the source start pulse SSP. For instance, as shown in FIG. 4, if an image signal expressing 1 to 13 is displayed on one horizontal line of the liquid crystal display panel 30 with the aid of the source start pulse SSP, then an image signal B indicated by the slanted lines, that is, only 3 to 12 are displayed.

SUMMARY OF THE INVENTION

Accordingly, the present invention is directed to a driving apparatus for a liquid crystal display that substantially obviates one or more of the problems due to limitations and disadvantages of the related art.

An advantage of the present invention is to provide a driving apparatus for a liquid crystal display that is capable of adjusting a field area displayed on the liquid crystal display panel at the edge thereof.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a driving apparatus for a liquid crystal display may, for example, include an image signal processor for separating a television image signal from a complex image signal and for separating a complex synchronizing signal; a liquid crystal display panel for displaying the television image signal; a timing controller for generating a source start pulse determining a display start time of the television image signal displayed on the liquid crystal display panel using an internal clock signal and the complex synchronizing signal from the image signal processor; and delay means electrically connected to the timing controller for delaying the internal clock signal.

The driving apparatus further includes a data driver for applying the television image signal to data lines of the liquid crystal display panel in response to control signals including the source start pulse from the timing controller; and a gate driver for driving gate lines of the liquid crystal display panel in response to control signals from the timing controller.

In the driving apparatus, the internal clock signal includes a frequency-dividing clock signal having the same period as the complex synchronizing signal; and a horizontal synchronizing signal having the same period as the complex synchronizing signal and inverted with respect to the complex synchronizing signal.

The driving apparatus further includes a phase locked loop control circuit for applying a phase locked loop for synchronizing the rising edge of the frequency-dividing clock signal with a center portion of the width of the complex synchronizing signal to the timing controller.

The timing controller includes a source start pulse generator for generating the source start pulse using the complex synchronizing signal and the internal clock signal from the delay means.

The delay means includes a variable resistor connected to an output terminal of the timing controller for outputting the frequency-dividing clock signal; and a capacitor connected between the variable resistor and a ground voltage source, wherein a node between the variable resistor and the capacitor is connected to a clock input terminal of the source start pulse generator.

Alternatively, the delay means includes a variable resistor connected to an output terminal of the timing controller for outputting the horizontal synchronizing signal; and a capacitor connected between the variable resistor and a ground voltage source, wherein a node between the variable resistor and the capacitor is connected to a clock input terminal of the source start pulse generator.

In another aspect of the present invention, a driving apparatus for a liquid crystal display may, for example, include an image signal processor for separating a television image signal from a complex image signal and for separating a complex synchronizing signal; a liquid crystal display panel for displaying the television image signal; a variable circuit for generating a variable signal for adjusting a display start time of the television image signal displayed on the liquid crystal display panel by a user; and a timing controller for generating a source start pulse determining a display start time of the television image signal displayed on the liquid crystal display panel using the variable signal and the complex synchronizing signal.

The driving apparatus further includes a data driver for applying the television image signal to data lines of the liquid crystal display panel in response to control signals including the source start pulse from the timing controller; and a gate driver for driving gate lines of the liquid crystal display panel in response to control signals from the timing controller.

In the driving apparatus, the timing controller includes a frequency divider for generating internal clock signals using the complex synchronizing signal; and a source start pulse generator for generating the source start pulse using the variable signal from the variable circuit and the complex synchronizing signal from the image signal processor.

Herein, the internal clock signal includes a frequency-dividing clock signal having the same period as the complex synchronizing signal; and a horizontal synchronizing signal having the same period as the complex synchronizing signal and inverted with respect to the complex synchronizing signal.

The driving apparatus further includes a phase locked loop control circuit for applying a phase locked loop for synchronizing the rising edge of the frequency-dividing clock signal with a center portion of the width of the complex synchronizing signal to the timing controller.

The variable circuit delays the internal clock signal from the frequency divider to generate a variable signal for varying the display start time, and applies the generated variable signal to the source start pulse generator.

The variable circuit includes a variable resistor connected to an output terminal of the timing controller for outputting the frequency-dividing clock signal; and a capacitor connected between the variable resistor and a ground voltage source, wherein a node between the variable resistor and the capacitor is connected to a clock input terminal of the source start pulse generator.

Herein, the variable resistor is adjusted by a user.

Alternatively, the variable circuit includes a variable resistor connected to an output terminal of the timing controller for outputting the horizontal synchronizing signal; and a capacitor connected between the variable resistor and a ground voltage source, wherein a node between the variable resistor and the capacitor is connected to a clock input terminal of the source start pulse generator.

Herein, the variable resistor is adjusted by a user.

In still another aspect of the present invention, a flat panel display device may, for example, include an image signal processor for separating a video image signal from a complex image signal and for separating a complex synchronizing signal; a display panel for displaying the video image signal; a variable circuit for generating a variable signal for adjusting a display start time of the video image signal displayed on the display panel by a user; and a timing controller for generating a source start pulse determining a display start time of the video image signal displayed on the display panel using the variable signal and the complex synchronizing signal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to an embodiment of the present invention, example of which is illustrated in the accompanying drawings.

Figure 5:
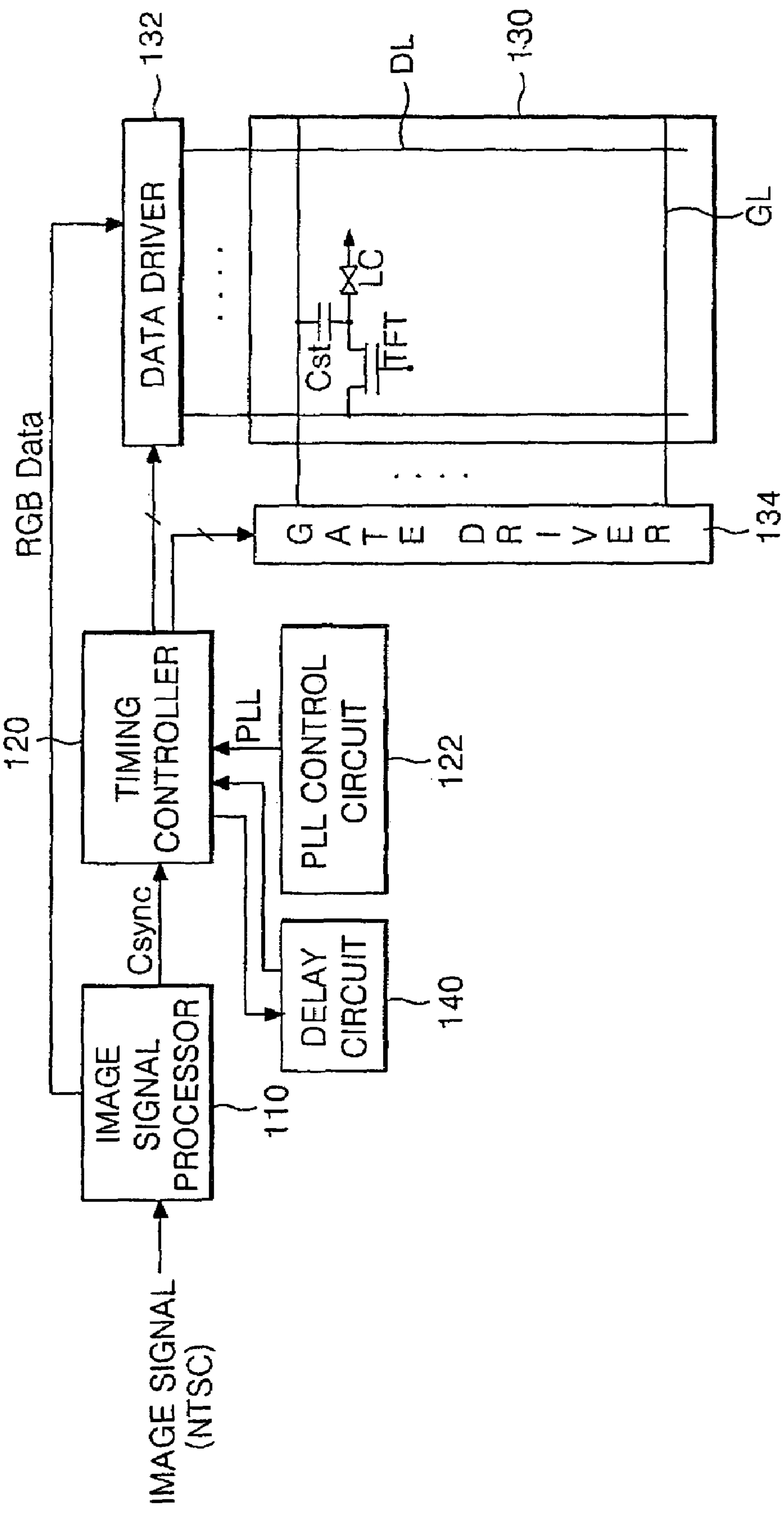
FIG. 5 is a schematic block diagram showing a configuration of a driving apparatus for a liquid crystal display according to an embodiment of the present invention.
Figure 6:
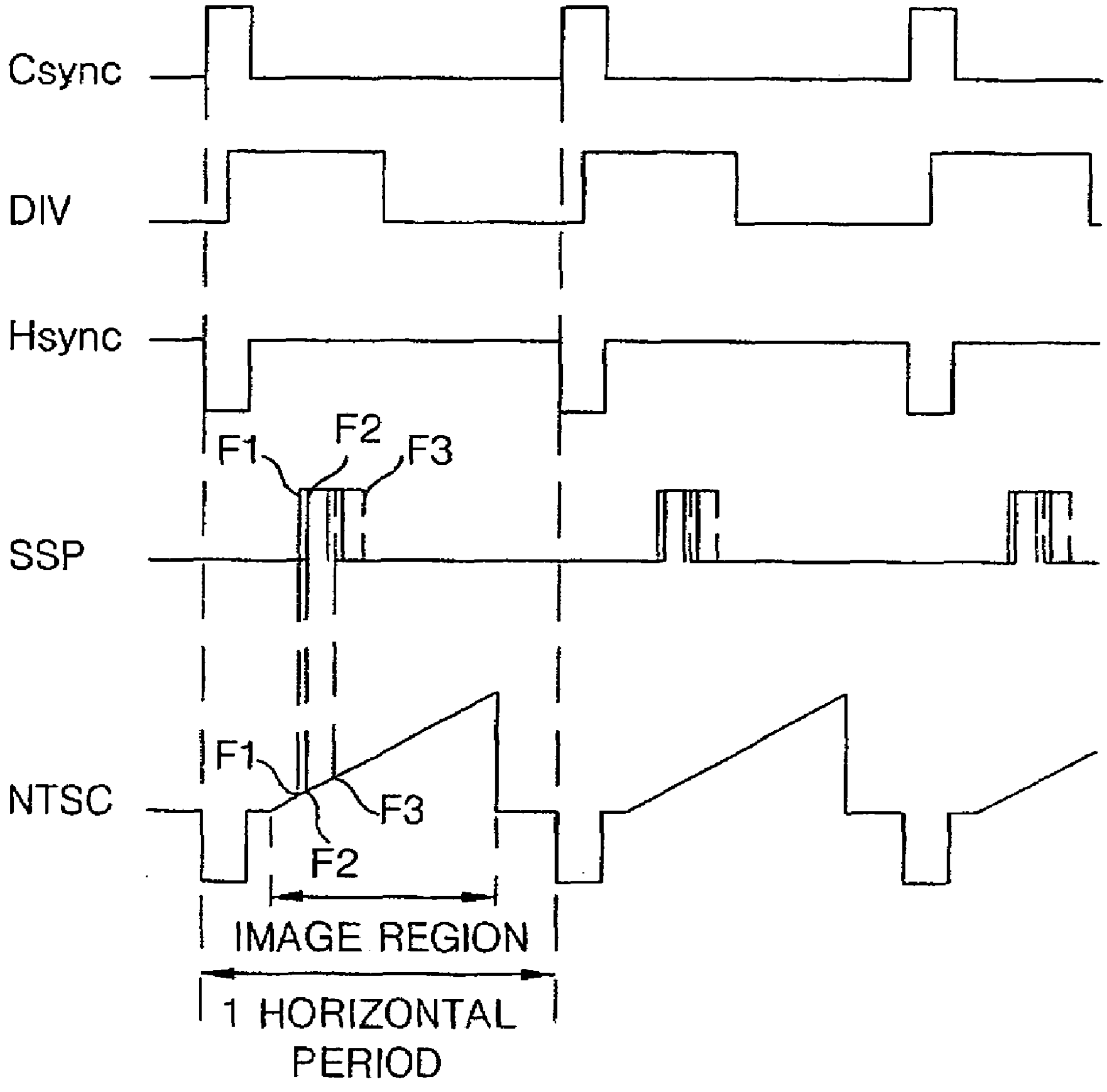
FIG. 6 is a waveform diagram of clock signals used for a driving the liquid crystal display panel shown in FIG. 5.

Referring to FIG. 5 and FIG. 6, an LCD driving apparatus according to an embodiment of the present invention includes a liquid crystal display panel 130 having liquid crystal cells arranged in a matrix type, a gate driver 134 for driving gate lines GL of the liquid crystal display panel 130, a data driver 132 for driving data lines DL of the liquid crystal display panel 130, and an image signal processor 110 for receiving an NTSC television signal to apply a television complex signal divided into Red, Green and Blue data signals R, G and B to the data driver 132 and output a complex synchronizing signal Csync. The LCD driving apparatus further includes a phase locked loop (PLL) control circuit 122 for outputting a phase locked loop, a timing controller 120 for receiving the complex synchronizing signal Csync from the image signal processor 10 to make a divisional output of a horizontal synchronizing signal Hsync and a vertical synchronizing signal Vsync and for applying control signals to the data driver 132 and the gate driver 134 in response to the horizontal synchronizing signal Hsync and the vertical synchronizing signal Vsync and the PLL control circuit 122 to thereby control a driving timing thereof, and a delay circuit 140 for delaying the clock signals from the timing controller 120 to re-apply the delayed clock signals to the timing controller 120.

The liquid crystal display panel 130 includes liquid crystal cells arranged in a matrix type, and thin film transistors TFT provided at crossings between the gate lines GL and the data lines DL to be connected to the liquid crystal cells.

The thin film transistor TFT is turned on when a scanning signal, that is, a gate high voltage VGH from the gate line GL is applied, to thereby apply a pixel signal from the data line DL to the liquid crystal cell. On the other hand, the thin film transistor TFT is turned off when a gate low voltage VGL is applied from the gate line GL, to thereby maintain a pixel signal charged in the liquid crystal cell.

The liquid crystal cell can be equivalently expressed as a liquid crystal capacitor LC, and includes a pixel electrode connected to the thin film transistor. TFT and a common electrode that are opposed to each other with having a liquid crystal therebetween. Further, the liquid crystal cell includes a storage capacitor Cst for making stable maintenance of the charged pixel signal until the next pixel is charged. This storage capacitor Cst is provided between a previous gate line and the pixel electrode. In such a liquid crystal cell, an alignment state of the liquid crystal having a dielectric anisotropy varies in response to the pixel signal charged via the thin film transistor TFT to control a light transmittance, thereby implementing a gray scale level.

The gate driver 134 sequentially applies the gate high voltage VGH to the gate lines GL in response to gate control signals GSP, GSC and GOE from the timing controller 120. Thus, the gate driver 134 allows the thin film transistors TFT connected to the gate lines GL to be driven for each gate line.

More specifically, the gate driver 134 shifts a gate start pulse GSP in response to a gate shift pulse GSC to generate a shift pulse. Further, the gate driver 134 applies the gate high voltage VGH to the corresponding gate line GL every horizontal period H1, H2, . . . in response to the shift pulse. In this case, the gate driver 134 applies the gate high voltage VGH only in an enable period in response to a gate output enable signal GOE. On the other hand, the gate driver 134 applies the gate low voltage VGL in the remaining period when the gate high voltage VGH is not applied to the gate lines GL.

The data driver 132 applies pixel data signals for each one line to the data lines DL every horizontal period 1H, 2H, . . . in response to data control signals SSP, SSC and SOE from the timing controller 120. Particularly, the data driver 132 applies RGB data from the image signal processor 110 to the liquid crystal display panel 130.

More specifically, the data driver 132 shifts a source start pulse SSP in response to a source shift clock SSC to generate a sampling signal. Then, the data driver 32 sequentially inputs analog RGB data for each certain unit in response to the sampling signal to latch them. Further, the data driver 32 applies the latched analog data for one line to the data lines DL.

The image signal processor 110 converts image signals applied from the exterior into voltages R, G and B suitable for driving of the liquid crystal display panel 130 in accordance with a property of the liquid crystal display panel 130 to apply them to the data driver 132, and applies a complex synchronizing signal Csync to the timing controller 120. Herein, the complex synchronizing signal Csync is separately generated from the image signal NTSC.

The PLL control circuit 122 generates a phase locked loop PLL having a desired oscillation frequency to apply it to the timing controller 120.

Figure 7:
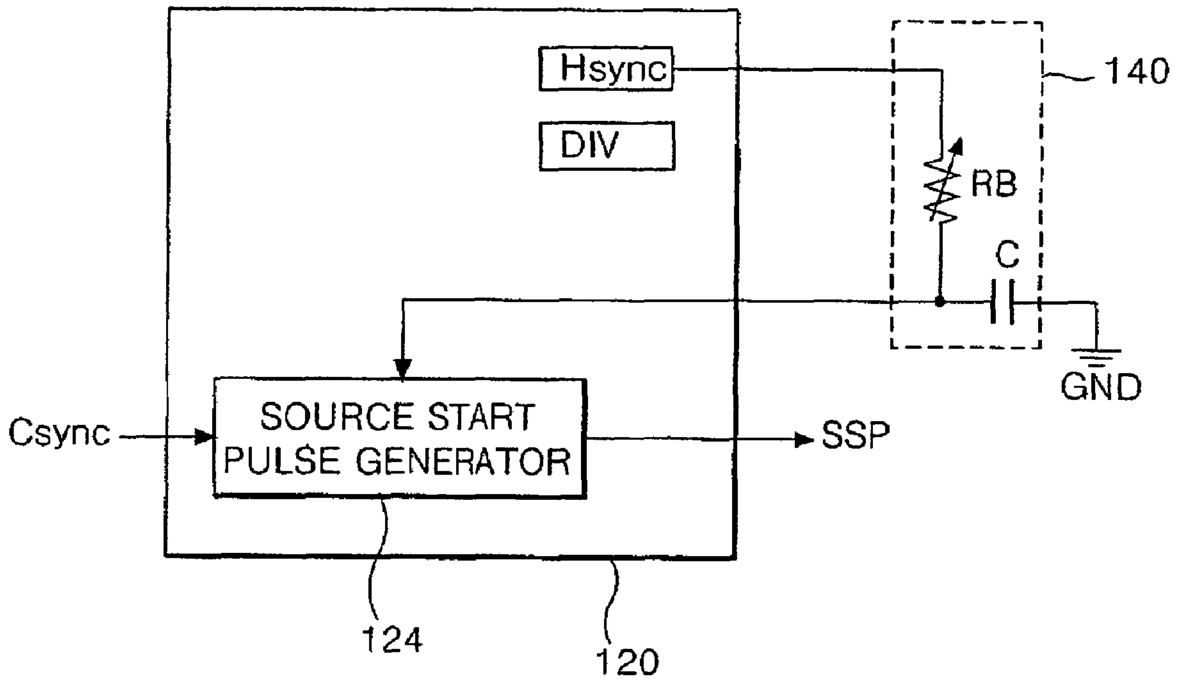
FIG. 7 is a block diagram of the timing controller for generating a source start pulse shown in FIG. 6.

The timing controller 120 includes a frequency divider (not shown) for outputting a frequency-dividing signal DIV having the same period as the complex synchronizing signal Csync and various clocks, and synchronizes the complex synchronizing signal Csync with the frequency-dividing signal DIV with the aid of the phase locked loop PLL. Herein, the frequency-dividing signal DIV is synchronized with a center portion of the width of the complex synchronizing signal Csync. The timing controller 120 generates a horizontal synchronizing signal Hsync inverted from the complex synchronizing signal Csync using various clocks from the frequency divider. Further, as shown in FIG. 7, the timing controller 120 includes a source start pulse generator 124 for generating a source start pulse SSP that determines a horizontal display start time F1, F2 and F3 of the image signal NTSC display on the liquid crystal display panel 130.

The source start pulse generator 124 receives the complex synchronizing signal Csync from the image signal processor 110, and receives a clock signal from the delay circuit 140. In this case, the delay circuit 140 delays the horizontal synchronizing signal Hsync generated from the internal part of the timing controller 120 by a RC time constant to apply it to the source start pulse generator 124.

To this end, the delay circuit 140 includes a variable resistor RB connected to a horizontal synchronizing signal (Hsync) output line of the timing controller 120, and a capacitor C connected between the variable resistor RB and a ground voltage source GND. Herein, a node between the variable resistor RB and the capacitor C is connected to a clock input terminal of the source start pulse generator 124.

Such a delay circuit 140 sets a resistance value of the variable resistor RB to delay the horizontal synchronizing signal Hsync, and applies the delayed clock signal to the source start pulse generator 124. Thus, the source start pulse generator 124 generates a source start pulse SSP with the aid of a complex synchronizing signal Csync and a clock signal from the delay circuit 140. Accordingly, the source start pulse SSP applied from the timing controller 120 to the data driver 132 varies in accordance with a RC time constant of the delay circuit 140.

Figure 8:
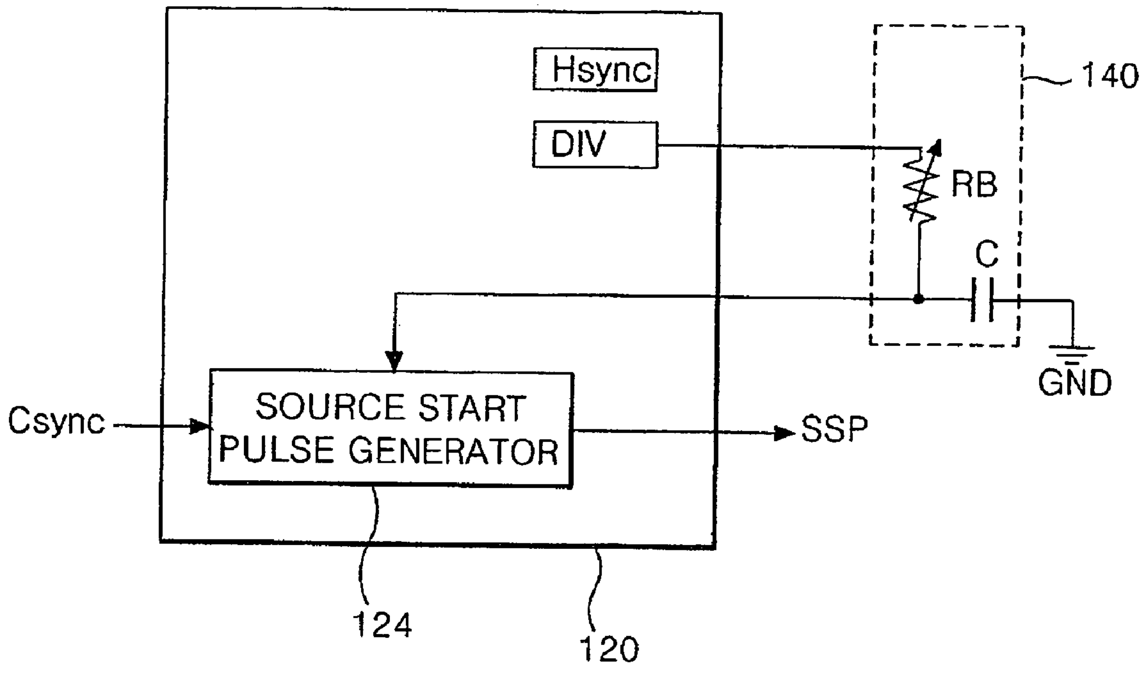
FIG. 8 is a block diagram of another example of the timing controller for generating a source start pulse shown in FIG. 6.

Alternatively, as shown in FIG. 8, the delay circuit 140 includes a variable resistor RB connected to a frequency-dividing signal (DIV) output line of the timing controller 120, and a capacitor C connected between the variable resistor RB and a ground voltage source GND. Herein, a node between the variable resistor RB and the capacitor C is connected to a clock input terminal of the source start pulse generator 124. Such a delay circuit 140 varies a resistance value of the variable resistor RB to delay the frequency-dividing signal DIV, and applies the delayed clock signal to the source start pulse generator 124. Thus, the source start pulse generator 124 generates a source start pulse SSP with the aid of the complex synchronizing signal Csync and the clock signal from the delay circuit 140. Accordingly, the source start pulse SSP applied from the timing controller 120 to the data driver 132 varies in accordance with the RC time constant of the delay circuit 140.

Figure 9:
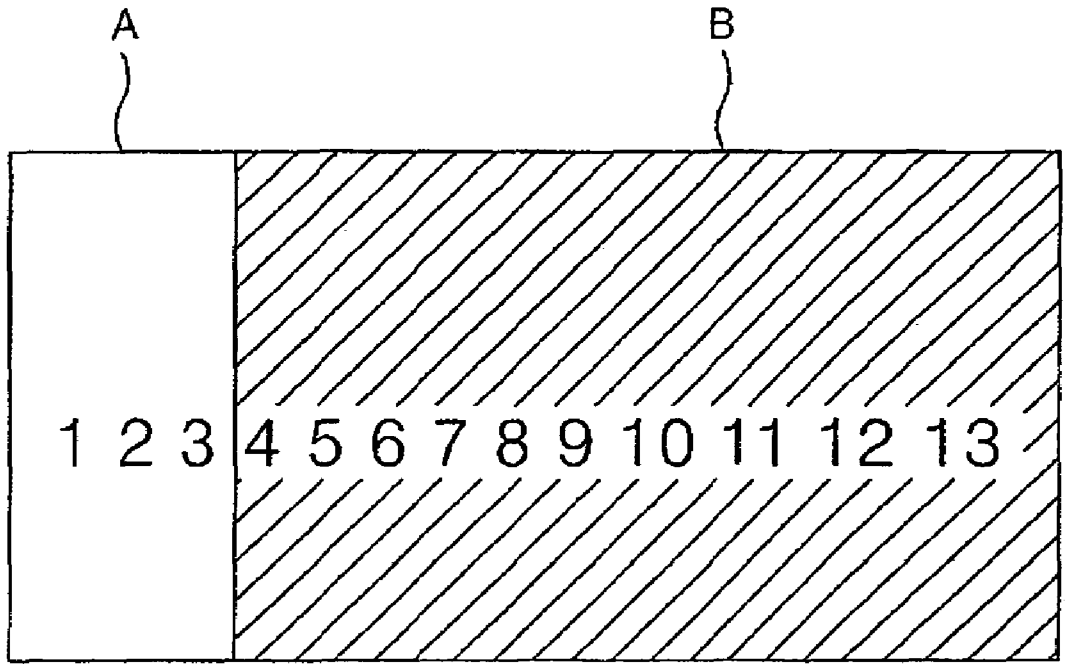
FIG. 9 depicts an image displayed on the liquid crystal display panel by an image signal and a source start pulse shown in FIG. 6.

Such an LCD driving apparatus displays an image from a start time F1, F2 and F3 of the source start pulse SSP, of an image region of the image signal NTSC, on one horizontal line of the liquid crystal display panel 130 with the aid of the source start pulse SSP. For instance, as shown in FIG. 9, if an image signal expressing 1 to 13 is displayed on one horizontal line of the liquid crystal display panel 130 with the aid of the source start pulse SSP, then an image signal B indicated by the slanted lines, that is, 4 to 13 only are displayed. In other words, a user is able to set a resistance value of the variable resistor RB of the delay circuit 140 to choose a start time, for example, among start time F1, F2 and F3 of the source start pulse SSP, thereby changing display start time F1, F2 and F3 of the image signal NTSC.

Figure 1:
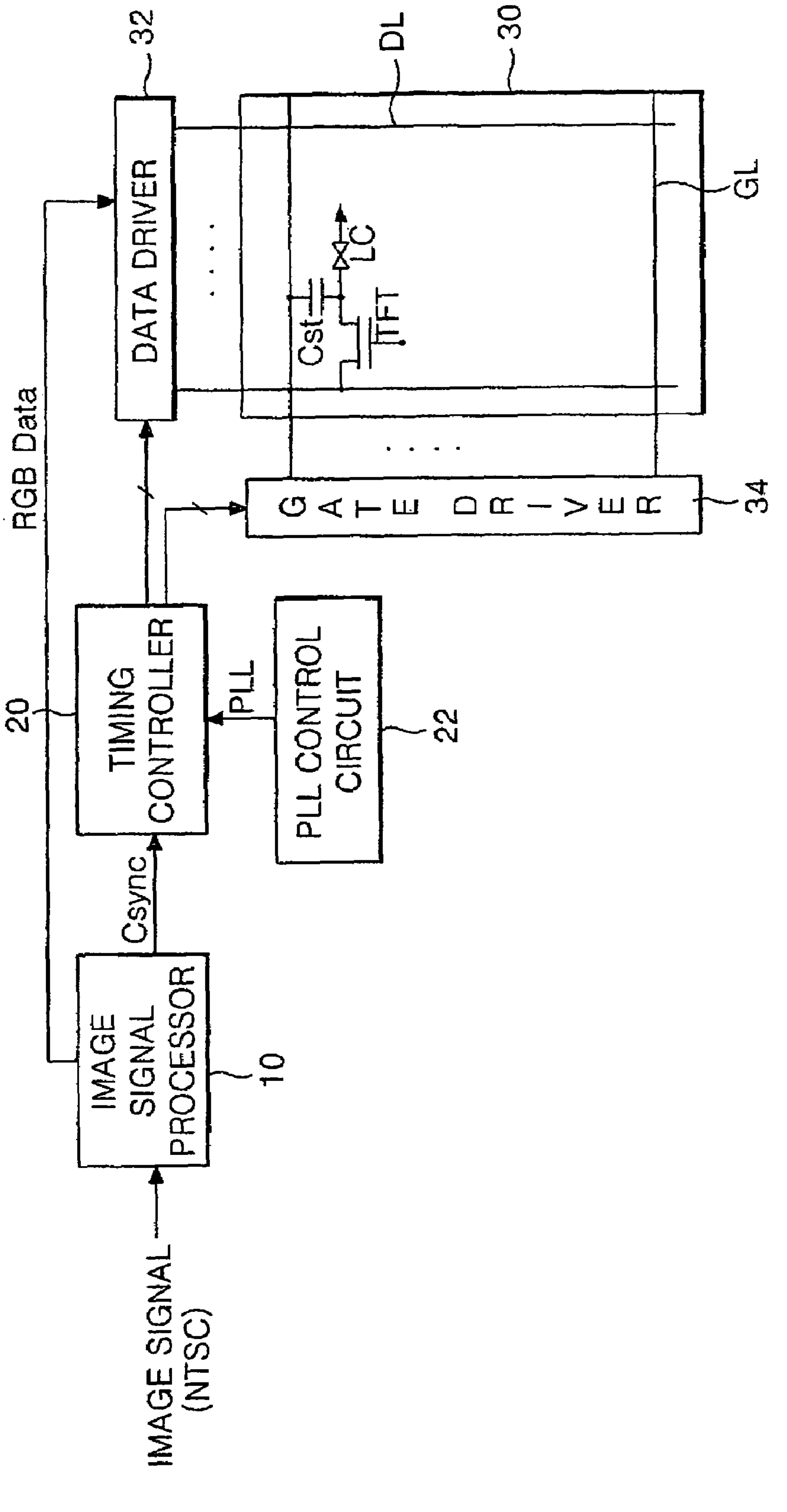
FIG. 1 RELATED ART
FIG. 1 is a schematic block diagram showing a configuration of a related art driving apparatus for a liquid crystal display.
Figure 2:
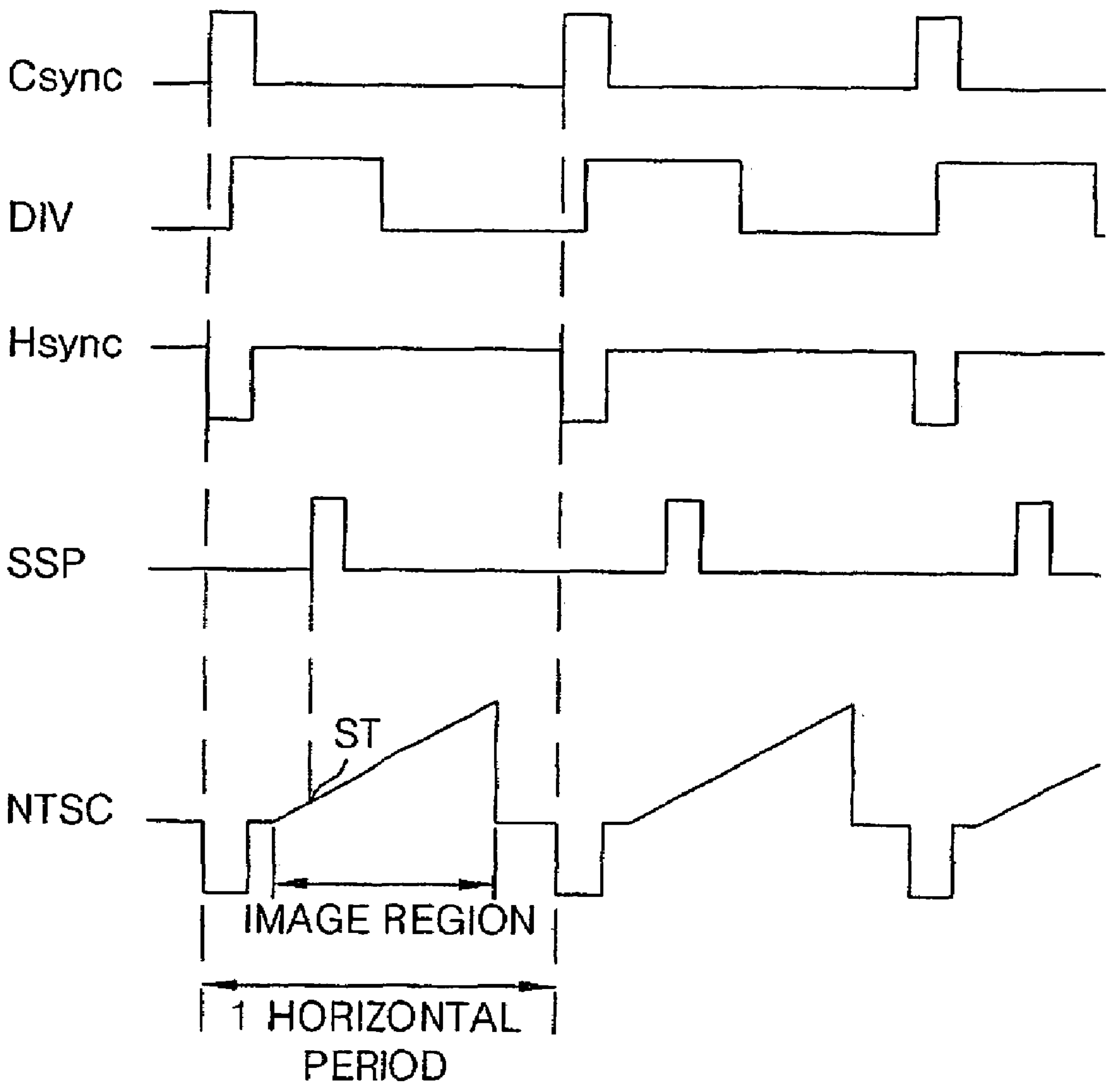
FIG. 2 RELATED ART
FIG. 2 is a waveform diagram of clock signals used for a driving the liquid crystal display panel shown in FIG. 1.
Figure 3:
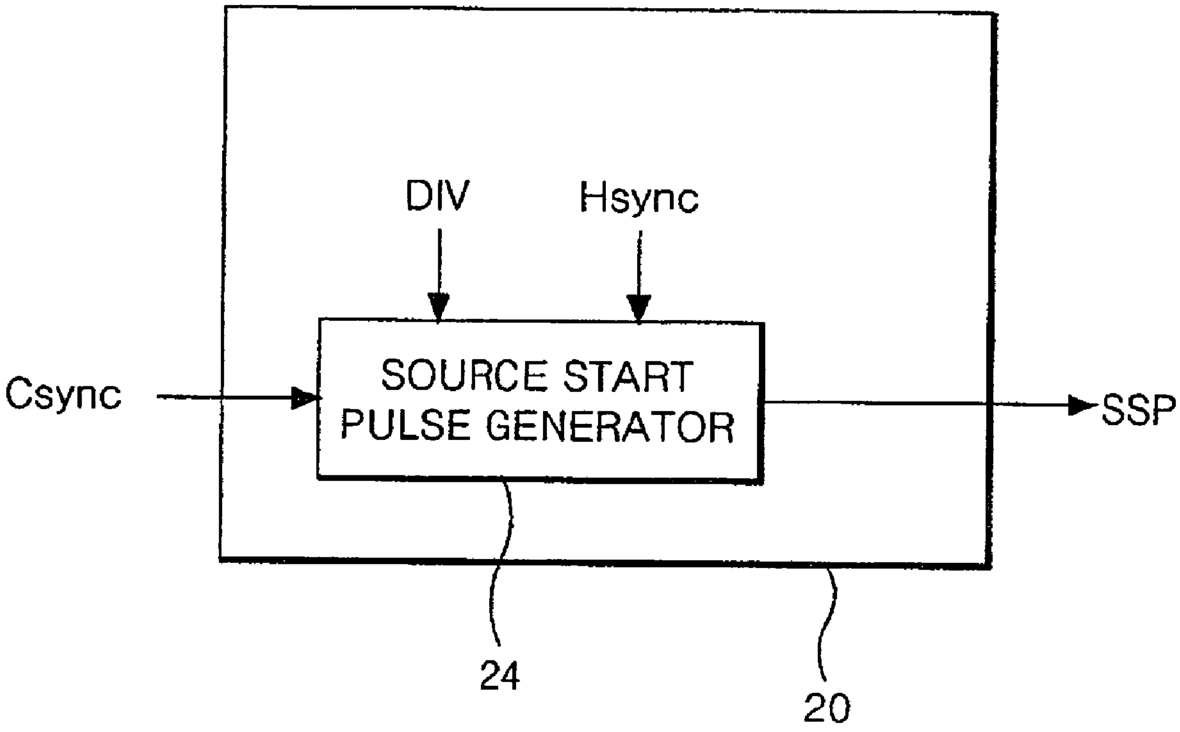
FIG.3 RELATED ART
FIG. 3 is a block diagram of the timing controller for generating a source start pulse shown in FIG. 2.
Figure 4:
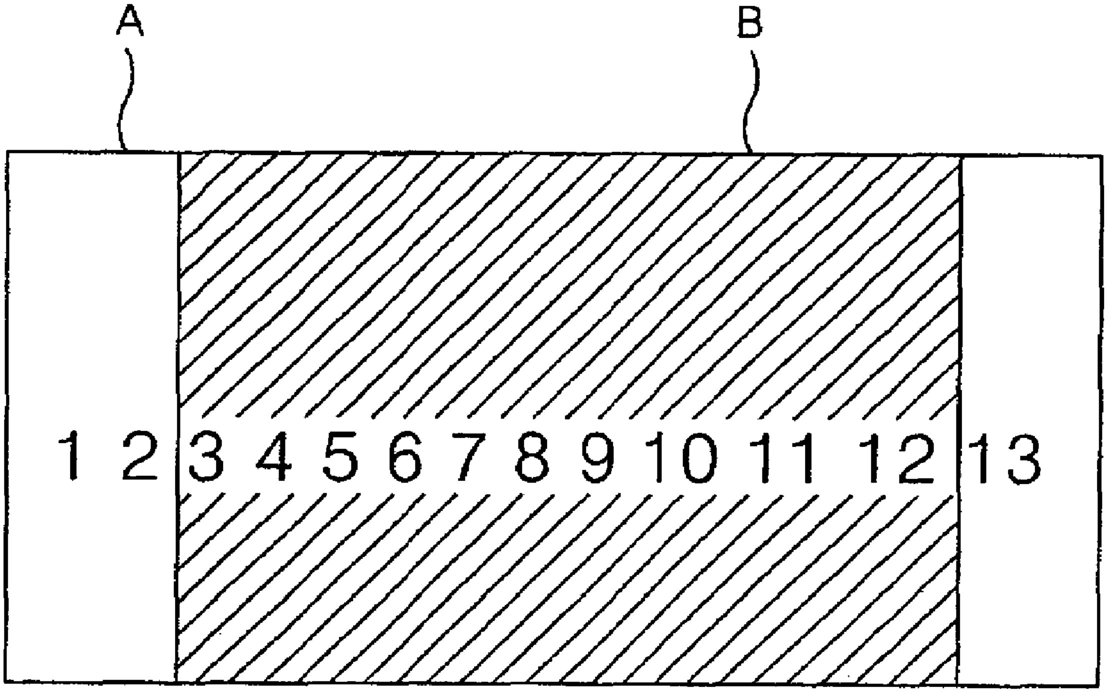
FIG. 4 RELATED ART
FIG. 4 depicts an image displayed on the liquid crystal display panel by an image signal and a source start pulse shown in FIG. 2.
Figure 10:
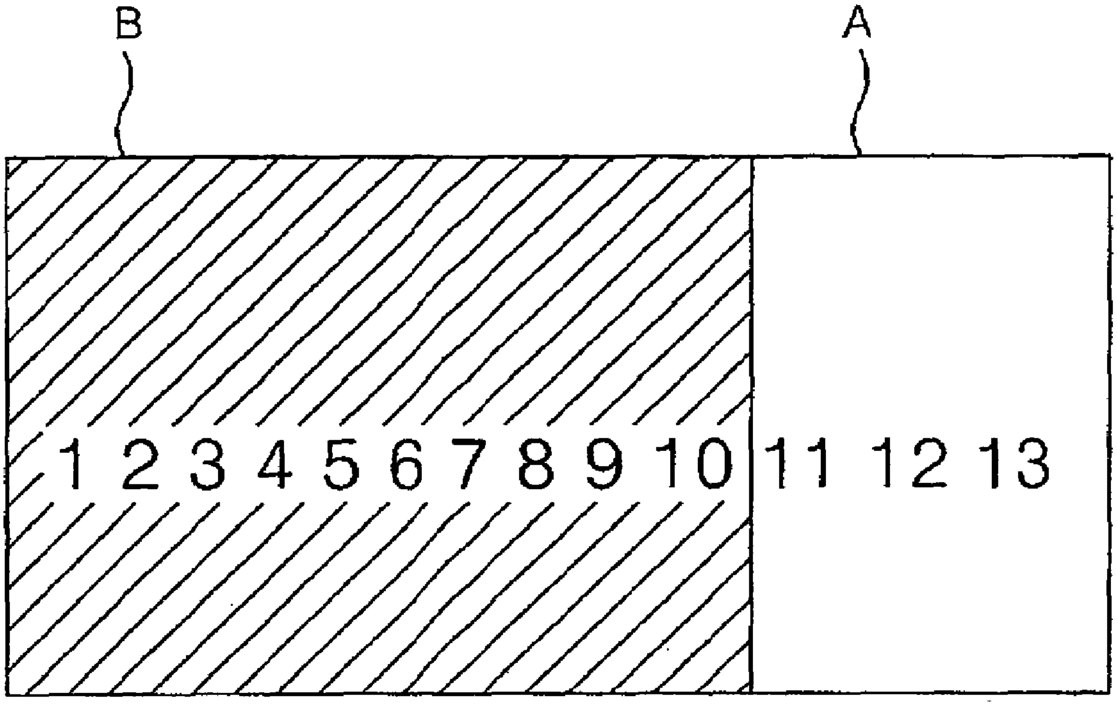
FIG. 10 depicts another image displayed on the liquid crystal display panel by an image signal and a source start pulse shown in FIG. 6.

More specifically, when a television image signal NTSC is an image A shown in FIG. 9, a user can change the resistance value of the variable resistor RB to display an image B expressing the numbers 4 to 13 indicated by the slated lines on the liquid crystal display panel 130 or to display an image B expressing the numbers 1 to 10 as shown in FIG. 10 on the liquid crystal display panel 130. Accordingly, the LCD driving apparatus according to the embodiment of the present invention allows viewers to observe other images (1, 2, 13) that could not be observed by the image B in the related art shown in FIG. 4 in one horizontal direction of the liquid crystal display panel 130. Herein, 1 and 2 images shown in FIG. 10 are delayed by one when 0 image is included in the television image signal NTSC, to thereby be displayed on the liquid crystal display panel 130.

Consequently, the LCD driving apparatus according to the embodiment of the present invention is capable of changing the source start pulse SSP, which determines display start time F1, F2 and F3 of the image signal displayed on one horizontal line of the liquid crystal display panel 130, by adjusting the RC time constant, thereby allowing a user to display a desired image.

As described above, the LCD driving apparatus according to the present invention includes the delay circuit having the variable resistor and the capacitor in order to change the source start pulse. Thus, the present LCD driving apparatus sets a resistance value of the variable resistor to change the source start pulse, which determines the display start time of the image signal displayed on one horizontal line of the liquid crystal display panel, thereby allowing a user to display a desired image. Accordingly, the LCD driving apparatus according to the present invention allows a user to adjust an area of a picture displayed on the liquid crystal display panel at the exterior thereof. It should be understood that the principles of the present invention can be applied to other flat panel displays as well as other displays as a whole.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A driving apparatus for a liquid crystal display, comprising:

an image signal processor for separating a television image signal from a complex image signal and for separating a complex synchronizing signal;

a liquid crystal display panel for displaying the television image signal;

delay means electrically connected to a source start pulse generator of a timing controller for delaying one of a frequency-dividing clock signal and a horizontal synchronizing signal from the timing controller and supplying the delayed one to the source start pulse generator of the timing controller; and the source start pulse generator for generating a source start pulse determining a display start time of the television image signal displayed on the liquid crystal display panel using the delayed one from the delay means and the complex synchronizing signal from the image signal processor.

2. The driving apparatus as claimed in claim 1, further comprising:

a data driver for applying the television image signal to data lines of the liquid crystal display panel in response to a first set of control signals from the timing controller, the first set of control signals including the source start pulse from the timing controller; and a gate driver for driving gate lines of the liquid crystal display panel in response to a second set of control signals from the timing controller.

3. The driving apparatus as claimed in claim 1, wherein the frequency-dividing clock signal has the same period as the complex synchronizing signal; and the horizontal synchronizing signal is inverted from the complex synchronizing signal.

4. The driving apparatus as claimed in claim 3, further comprising:

a phase locked loop control circuit for applying a phase locked loop for synchronizing a rising edge of the frequency-dividing clock signal with a center portion of the width of the complex synchronizing signal to the timing controller.

5. The driving apparatus as claimed in claim 1, wherein the delay means includes:

a variable resistor connected to an output terminal of the timing controller for outputting the frequency-dividing clock signal; and a capacitor connected between the variable resistor and a ground voltage source, wherein a node between the variable resistor and the capacitor is electrically connected to a clock input terminal of the source start pulse generator.

6. The driving apparatus as claimed in claim 1, wherein the delay means includes:

a variable resistor connected to an output terminal of the timing controller for outputting the horizontal synchronizing signal; and a capacitor connected between the variable resistor and a ground voltage source, wherein a node between the variable resistor and the capacitor is connected to a clock input terminal of the source start pulse generator.

7. A driving apparatus for a liquid crystal display, comprising:

an image signal processor for separating a television image signal from a complex image signal and for separating a complex synchronizing signal;

a liquid crystal display panel for displaying the television image signal;

a variable circuit connected to a source start pulse generator of a timing controller for generating a variable signal delayed from one of a frequency-dividing clock signal and a horizontal synchronizing signal from the timing controller for adjusting a display start time of the television image signal displayed on the liquid crystal display panel by a user and supplying the delayed one to the source start pulse generator of the timing controller;

the source start pulse generator for generating a source start pulse determining a display start time of the television image signal displayed on the liquid crystal display panel using the variable signal from variable circuit and the complex synchronizing signal; and a phase locked loop control circuit for generating a phase locked loop and applying the phase locked loop to the timing controller.

8. The driving apparatus as claimed in claim 7, further comprising:

a data driver for applying the television image signal to data lines of the liquid crystal display panel in response to a first set of control signals from the timing controller, the first set of control signals including the source start pulse from the timing controller; and a gate driver for driving gate lines of the liquid crystal display panel in response to a second set of control signals from the timing controller.

9. The driving apparatus as claimed in claim 7, wherein the timing controller includes:

a frequency divider for generating the one of a frequency-dividing clock signal and a horizontal synchronizing signal using the complex synchronizing signal.

10. The driving apparatus as claimed in claim 9, wherein the frequency-dividing clock signal has the same period as the complex synchronizing signal; and the horizontal synchronizing signal is inverted from the complex synchronizing signal.

11. The driving apparatus as claimed in claim 10, further comprising:

a phase locked loop control circuit for applying a phase locked loop for synchronizing a rising edge of the frequency-dividing clock signal with a center portion of the width of the complex synchronizing signal to the timing controller.

12. The driving apparatus as claimed in claim 10, wherein the variable circuit delays the one of a frequency-dividing clock signal and a horizontal synchronizing signal from the frequency divider to generate a variable signal for varying the display start time, and applies the generated variable signal to the source start pulse generator.

13. The driving apparatus as claimed in claim 12, wherein the variable circuit includes:

a variable resistor connected to an output terminal of the timing controller for outputting the frequency-dividing clock signal; and a capacitor connected between the variable resistor and a ground voltage source, wherein a node between the variable resistor and the capacitor is electrically connected to a clock input terminal of the source start pulse generator.

14. The driving apparatus as claimed in claim 13, wherein the variable resistor is adjusted by a user.

15. The driving apparatus as claimed in claim 12, wherein the variable circuit includes:

a variable resistor connected to an output terminal of the timing controller for outputting the horizontal synchronizing signal; and a capacitor connected between the variable resistor and a ground voltage source, wherein a node between the variable resistor and the capacitor is electrically connected to a clock input terminal of the source start pulse generator.

16. The driving apparatus as claimed in claim 15, wherein the variable resistor is adjusted by a user.

17. A flat panel display device, comprising:

an image signal processor for separating a video image signal from a complex image signal and for separating a complex synchronizing signal;

a display panel for displaying the video image signal;

a variable circuit connected to a source start pulse generator of a timing controller for generating a variable signal delayed from one of a frequency-dividing clock signal and a horizontal synchronizing signal from the timing controller for adjusting a display start time of the video image signal displayed on the display panel by a user and supplying the delayed one to the source start pulse generator of the timing controller;

the source start pulse generator for generating a source start pulse determining a display start time of the video image signal displayed on the display panel using the variable signal from variable circuit and the complex synchronizing signal; and a phase locked loop control circuit for generating a phase locked loop and applying the phase locked loop to the timing controller.

18. The flat panel display device as claimed in claim 17, wherein the timing controller includes:

a frequency divider for generating the one of a frequency-dividing clock signal and a horizontal synchronizing signal using the complex synchronizing signal.

19. The flat panel display device as claimed in claim 18, wherein the frequency-dividing clock signal has the same period as the complex synchronizing signal; and the horizontal synchronizing signal is inverted from the complex synchronizing signal.

* * * * *